June 30, 1931.  G. H. HORNE ET AL  1,812,339
APPARATUS FOR HEAT INTERCHANGING
Filed Feb. 25, 1929  2 Sheets-Sheet 1
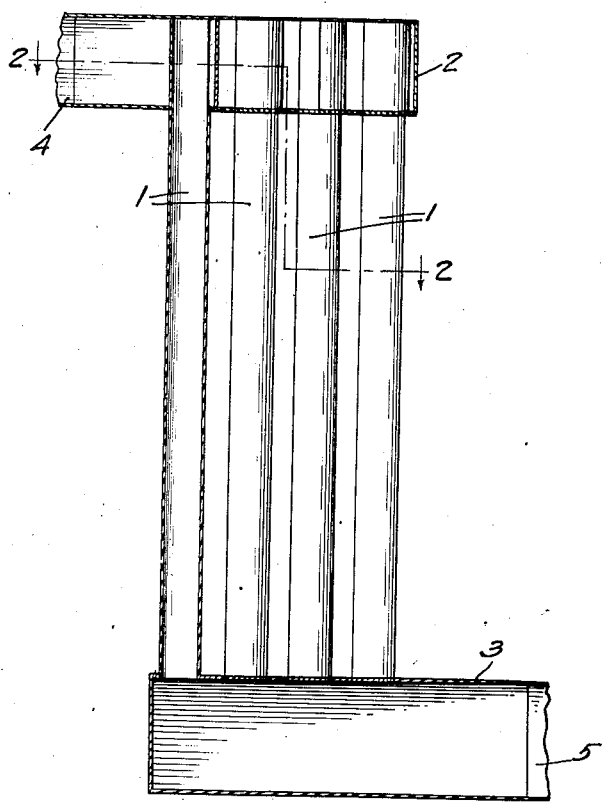
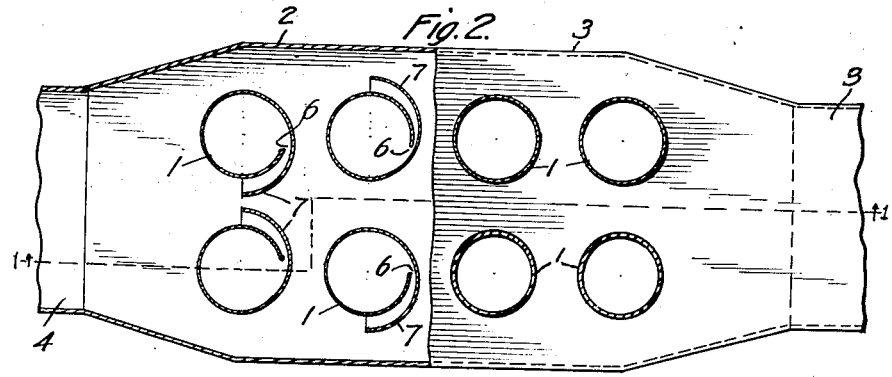
INVENTOR.
George H. Horne
Marcel A. Lissman
BY Arthur P. Knight
Alfred W. Knight
ATTORNEYS.

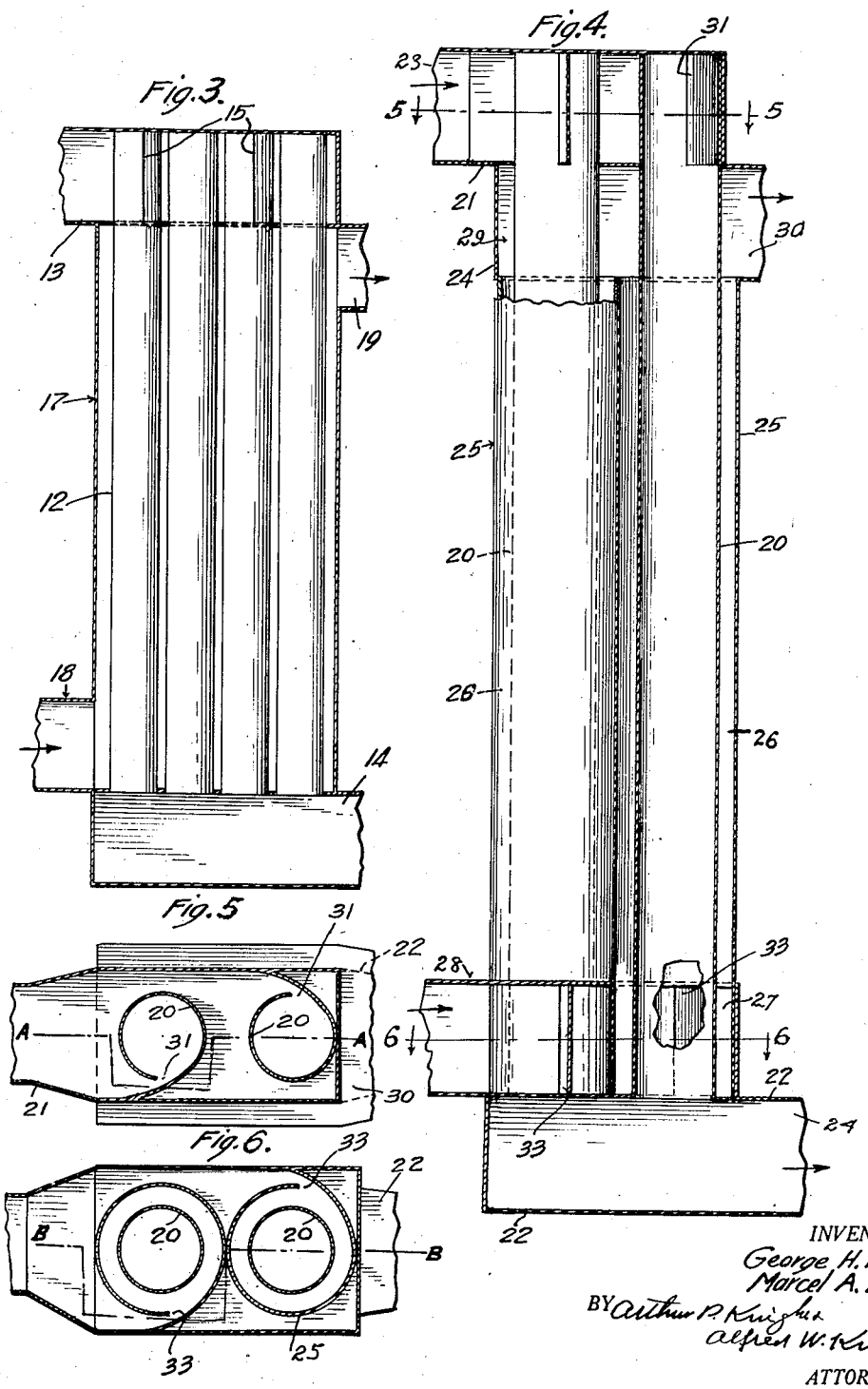

Patented June 30, 1931

1,812,339

UNITED STATES PATENT OFFICE

GEORGE H. HORNE, OF GLENDALE, AND MARCEL A. LISSMAN, OF LOS ANGELES, CALIFORNIA, ASSIGNORS TO INTERNATIONAL PRECIPITATION COMPANY, OF LOS ANGELES, CALIFORNIA, A CORPORATION OF CALIFORNIA

APPARATUS FOR HEAT INTERCHANGING

Application filed February 25, 1929. Serial No. 342,326.

This invention relates to improvement in apparatus for heat interchanging, and the main object of the invention is to provide heat interchanging apparatus of high efficiency and of low cost.

Our invention comprises an apparatus for cooling or heat interchanging, in which the gases, vapors or fluids to be treated are given a vortical or whirling movement in contact with the heat transferring surfaces or walls, thereby aiding in the transfer of heat and increasing the efficiency of heat interchange.

The accompanying drawings illustrate embodiments of our invention and referring thereto:

Fig. 1 is a vertical section on line 1—1 in Fig. 2 of one form of the apparatus, adapted for cooling gases, vapors or fluids.

Fig. 2 is a horizontal section on line 2—2 in Fig. 1.

Fig. 3 is a vertical section of a form of the invention adapted for heat interchanging in general.

Fig. 4 is a vertical section of a modified form of heat interchanger adapted to produce whirling motion on both sides of the heat transferring walls, the upper portion being taken on line A—A in Fig. 5 and the remainder on line B—B in Fig. 6.

Fig. 5 is a section on line 5—5 in Fig. 4.

Fig. 6 is a section on line 6—6 in Fig. 4.

The form of our invention shown in Fig. 1 comprises a plurality of vertically extending parallel cylindrical tubes 1, communicating at their upper ends with a header 2 and at their lower ends with a header 3. The upper header 2 may be connected to an inlet flue 4 and the lower header 3 to an outlet flue 5, so that the gases, vapors or other fluids to be cooled pass downwardly through the tubes. If desired, however, the connections may be such as to provide for upward flow through the tubes.

When the gas is to enter through the upper header, the tubes 1 extend upwardly within said header and are closed at their upper ends, for example by the top of the header, as shown. The admission of gas, vapor or fluid from the inlet header 2 to the tubes 1 is through openings 6 in the side walls of the portions of said tubes extending within said header, and a curved deflector 7 extends adjacent each opening obliquely inward toward the tube so as to deflect a portion of the gas, vapor or fluid passing in the header, tangentially into each tube, through the opening 6, thereby causing the gas, vapor or fluid to take on a vortical or whirling motion within the tube, and to descend in a spiral path from the inlet openings to the outlet header 3, which conducts it to the outlet flue 5.

The tubes 1 are exposed to a suitable cooling means, for example, to atmospheric air, so that hot gas, vapor or fluids supplied to the upper end of the tubes and passing down therethrough in spiral or helical path, is cooled to the temperature desired. In this operation the vortical or helical motion of the gas, vapor or fluid increases the cooling action by heat transmission to and through the tube wall, as it provides more effective contact of the gas, vapor or fluid with the wall of the tube, by reason of the fact that the gas, vapor or fluid may in this manner be given sufficiently high velocity to minimize the film or layer of "dead" or quiescent fluid next to the tube wall. Furthermore, the fact that the gas, vapor or fluid passes in a helical or oblique path downwardly within the tubes results in maintaining the same in contact with the tube walls for a much longer time than would be possible if the gas, etc. passed directly vertically downward within the tubes on account of the greater length of the helical path as compared with the height of the tubes. The gas, etc. may, therefore, by means of this invention be maintained in contact with the tube walls for a sufficient length of time to produce the requisite cooling effect while at the same time maintaining a high velocity sufficient to provide for effective heat transmission to the tube wall. The high velocity of the gas, vapor or fluid in contact with the tube wall also has the advantage that it prevents formation of a deposit of solid material on the tube walls in cases where the apparatus is used for cooling hot gases containing dust, fumes, or other suspended material. Any deposits resulting from collection of such material on the tube walls tends to seriously interfere with the conduction of heat to the walls of the tube from the gas, vapor or fluid and by preventing the formation of such a deposit we are enabled to maintain a high efficiency in the treatment of gases of this kind. The tubes are as shown, spaced apart sufficiently to permit access or circulation therebetween of atmospheric air or other cooling fluid.

The form of the apparatus shown in Fig. 3 comprises a plurality of vertical tubes 12 opening at their upper ends into an inlet header 13 and at their lower ends to an outlet header 14, said headers being connected to inlet and outlet flues as above described. Suitable means indicated at 15 may be provided at the upper end of each tube for admitting gas, vapor or fluid from the inlet header 13 to the respective tubes and to direct the gas, etc. in a helical or vertical path substantially as above described, means 15 being for example similar to the fluid admitting means shown at the upper ends of tubes 1 in Figs. 1 and 2. In Fig. 3 the tubes 12 are enclosed within a chamber or casing 17 having inlet 18 and an outlet 19 whereby a temperature controlling medium, such as a gas or fluid can be passed in contact with the tube 12 so as to take up heat therefrom or impart heat thereto as may be desired. The form of the invention shown in Fig. 3 may, therefore, be used as a heat interchanging means for either cooling or heating the gases passing through the tubes 12.

If desired, we may provide for vortical or whirling movement of the gas, vapor or fluid both within and around the tubes. As shown in Figs. 4 to 6, inner heat interchanging tubes indicated at 20 may be connected at their upper ends to an inlet header 21 and at their lower ends to an outlet header 22, said headers having suitable connections to inlet and outlet flues 23 and 24 respectively, and outer tubes 25 are provided extending concentrically around the respective tubes 20, for conducting the gas or fluid to be brought into heat interchanging relation to the gas or fluid passing through the tubes 20. An inlet header 27 connected to an inlet flue 28 communicates with the lower end of the annular passages 26 between the tubes 20 and 25 and an outlet header 29 connected to an outlet flue 30 is connected to the upper end of such passages. Suitable tangential inlet means 31 is provided at the upper end of each inner tube 20 for admitting and directing the gas, vapor or fluid tangentially into the upper end of each tube 20 and suitable means indicated at 33 is provided at the lower end of each of the outer tubes 25 aforesaid for directing gas, vapor or fluid tangentially into each of the said passages 26. The tangential inlet means 31 and 33 may be substantially the same as in the form of the invention first described, as shown more particularly in Figs. 7 and 8 respectively. The inner tubes 20 extend within the inlet header 21 and are provided with inlet openings in the side walls of the portions extending within said header and with curved deflectors for directing fluid tangentially into the upper ends of said tubes, while the outer tubes 25 extend within the inlet header 27 and are provided with inlet openings in the side walls of the portions extending within said last named header and with curved deflectors for directing fluid tangentially into the lower ends of the annular passages 26. In this form of the invention the gas, vapor or fluid passing within the tubes 20 is caused to whirl or move in a vortical manner and the gas, vapor or fluid passing in the passages 26 outside of the tubes 20 and within the tubes 25 is also caused to move in a helical path with vortical or whirling movement, so as to obtain the advantages above referred to in connection with both the fluid streams between which heat interchange is to be effected.

We claim:

1. A heat interchanging apparatus comprising a plurality of substantially parallel cylindrical tubes spaced apart sufficiently to permit access of fluid medium therebetween, an inlet header, all of said tubes extending within said inlet header at one end and being provided with inlet openings in the side walls of the portions extending within said header, and deflectors extending adjacent the inlet openings of the respective tubes and in position to direct fluid from said header through said inlet openings and substantially tangentially into said tubes, said tubes having fluid outlet openings at the end opposite said inlet header.

2. A heat interchanging apparatus comprising a plurality of substantially parallel cylindrical inner tubes and a plurality of cylindrical outer tubes extending concentrically around the respective inner tubes, an inlet header for the inner tubes at one end thereof and an inlet header for the outer tubes at the opposite end thereof, said tubes extending within their respective inlet headers and being provided with inlet openings in the side walls of the portions extending within said headers, and deflectors extending adjacent the inlet openings of the respective tubes and in position to direct fluid from the respective inlet headers through said inlet openings and substantially tangentially into the inner tubes and into the annular space between the inner and outer tubes, said tubes having fluid outlet openings at the ends opposite their respective inlet headers.

In testimony whereof we have hereunto subscribed our names this 12th day of February 1929.

GEORGE H. HORNE.
MARCEL A. LISSMAN.